United States Patent
Callaghan et al.

(10) Patent No.: US 11,029,967 B2
(45) Date of Patent: Jun. 8, 2021

(54) SECURE BOOT OF A VIRTUAL MACHINE

(71) Applicant: INTERNATIONAL BUSINESS MACHINES CORPORATION, Armonk, NY (US)

(72) Inventors: Patrick Joseph Callaghan, Vestal, NY (US); Michael Clark, Endicott, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 16/297,084

(22) Filed: Mar. 8, 2019

(65) Prior Publication Data

US 2020/0285483 A1    Sep. 10, 2020

(51) Int. Cl.
*G06F 9/44*    (2018.01)
*G06F 9/4401*    (2018.01)
*H04L 9/14*    (2006.01)
*G06F 9/455*    (2018.01)

(52) U.S. Cl.
CPC .......... *G06F 9/4406* (2013.01); *G06F 9/4416* (2013.01); *G06F 9/45558* (2013.01); *H04L 9/14* (2013.01); *G06F 2009/45591* (2013.01); *G06F 2009/45595* (2013.01)

(58) Field of Classification Search
CPC ............................ G06F 9/45558; G06F 21/575
See application file for complete search history.

(56) References Cited

U.S. PATENT DOCUMENTS

| 6,990,663 | B1 | 1/2006 | Arndt | |
|---|---|---|---|---|
| 2005/0086509 | A1 | 4/2005 | Ranganathan | |
| 2005/0246552 | A1 | 11/2005 | Bade | |
| 2008/0059799 | A1 | 3/2008 | Scarlata | |
| 2010/0325628 | A1 | 12/2010 | Haga | |
| 2011/0302400 | A1* | 12/2011 | Maino | G06F 21/72 713/2 |
| 2017/0364685 | A1* | 12/2017 | Shah | G06F 21/53 |

OTHER PUBLICATIONS

Berger, et al. "Scalable attestation: A step toward secure and trusted clouds." 2015 IEEE International Conference on Cloud Engineering (IC2E). IEEE, 2015. 10 pages.
Marquez, "Using Remote Attestation of Trust for Computer Forensics." Thesis submitted for the examination for the degree of Master of Science in Technology; Aalto University, School of Electrical Engineering, Nov. 20, 2018. 128 pages.
Wilkins et al., "UEFI secure boot in modern computer security solutions." United Extensible Firmware Interface (UEFI) Forum. Sep. 2013. 10 pages.

* cited by examiner

*Primary Examiner* — Albert Wang
(74) *Attorney, Agent, or Firm* — Cantor Colburn LLP; Steven Chiu

(57) ABSTRACT

A system includes at least a secure-boot file, a hypervisor, and a host. The secure-boot file is configured to securely boot a VM, where the secure-boot file is signed with a boot private key. The hypervisor is configured to run the VM. The hypervisor includes a boot public key corresponding to the boot private key, such that the hypervisor is configured to validate the secure-boot file, and the hypervisor is signed with a hypervisor private key. A kernel of the host is configured to run the VM, where the kernel includes a hypervisor public key corresponding to the hypervisor private key, such that the host is configured to validate the hypervisor.

25 Claims, 4 Drawing Sheets

SECURE BOOT OF A VIRTUAL MACHINE

BACKGROUND

The present invention relates to virtual machines and, more specifically, to the secure boot of a virtual machine.

The Unified Extensible Firmware Interface (UEFI) secure boot feature allows an operating system of a computer system to be booted so as to resist tampering by a rogue user who is present at the operating system itself but does not have permission to access the Basic Input Output System (BIOS) setup. For instance, utilizing the IBM® z14™ hardware, including the hardware management console (HMC), support element (SE) (i.e., a processing element), and trusted key entry (TKE), a secure boot of a HMC, SE, or TKE system can be performed. Specifically, various components involved in the secure boot are signed to enable validation, where these signed components include a shim program, a grub program, a kernel and initramfs (i.e., a set of directories utilized by the kernel), and one or more kernel modules. During the secure boot, the UEFI of the HMC, SE, or TKE system validates the signature of the shim program; the shim program validates the signature of the grub program, the kernel, and the initramfs; and the kernel validates the signature of each kernel module.

Additionally, Integrity Measurement Architecture (IMA) support and SELinux support can be provided for the HMC and the SE. Specifically, in addition to the kernel being securely booted, the kernel command line is fixed in the kernel image file through the use of IMA and SELinux, and thus, the kernel command line cannot be altered. This enables the use of two modes: monitor mode, and monitor and protect mode. In monitor mode, the unalterable kernel command line specifies SELinux in permissive mode and IMA protection in audit/log mode. In monitor and protect mode, the unalterable kernel command line specifies SELinux in enforcing mode and IMA protection in the default mode of giving permission errors for violations. In other words, in monitor mode, the SE monitors the integrity of the operating system and alerts of any issues found, while in monitor and protect mode, the SE shuts itself down responsive to issues.

As a result of secure boot, along with the added features described above, a user can have confidence that the operating system has not been altered, which would leave the computer system open to a wide range of attacks. However, virtual machines running on the computer system may still remain at risk, as secure boot does not natively extend to the booting of virtual machines (VMs).

SUMMARY

Embodiments of the present invention are directed to a system for securely booting a virtual machine (VM). A non-limiting example of the system includes at least a secure-boot file, a hypervisor, and a host. The secure-boot file is configured to securely boot a VM, where the secure-boot file is signed with a boot private key. The hypervisor is configured to run the VM. The hypervisor includes a boot public key corresponding to the boot private key, such that the hypervisor is configured to validate the secure-boot file, and the hypervisor is signed with a hypervisor private key. A kernel of the host is configured to run the hypervisor, where the kernel includes a hypervisor public key corresponding to the hypervisor private key, such that the host is configured to validate the hypervisor.

Embodiments of the invention are directed to a computer-program product for securely booting a virtual machine, the computer-program product including a computer-readable storage medium having program instructions embodied therewith. The program instructions are executable by a processor to cause the processor to perform a method. A non-limiting example of the method includes validating a variable set file for a secure boot, where validating the variable set file is performed by a hypervisor using a guest public key, and where the variable set file is signed with a guest private key corresponding to the guest public key. Further according to the method, a secure-boot file is validated, where the secure-boot file is configured to securely boot a VM based at least in part on the variable set file. Validating the secure-boot file is performed by the hypervisor using a boot public key, and the secure-boot file is signed with a boot private key corresponding to the boot public key. The secure-boot file is used by the hypervisor to securely boot the VM.

Embodiments of the present invention are directed to a computer-implemented method for securely booting a virtual machine. A non-limiting example of the computer-implemented method includes starting a hypervisor to boot a first version of a VM, where the hypervisor embeds a boot public key. The hypervisor validates a secure-boot file configured to securely boot the first version of the VM to extend a secure boot of a host, where validating the secure-boot file is performed using the boot public key. The hypervisor validates a variable set file useable by the secure-boot file to securely boot the VM.

Embodiments of the present invention are directed to a computer-implemented method for securely booting a virtual machine. A non-limiting example of the computer-implemented method includes providing, to a hypervisor, a secure-boot file and one or more variable set files. The secure-boot file is maintained in a kernel of a host and is configured to be used by a hypervisor to securely boot one or more VMs to extend a secure boot of a host to the one or more VMs. The one or more variable set files are useable by the secure-boot file to securely boot the one or more VMs. Additionally, a hypervisor public key is provided in the kernel. The hypervisor is generated for a first version of a VM, where the hypervisor includes a boot public key and a guest public key. The hypervisor is signed with a hypervisor private key corresponding to the hypervisor public key in the kernel. The secure-boot file of the kernel is signed with a boot private key corresponding to the boot public key. A first variable set file, of the one or more variable set files, is signed with a guest private key corresponding to the guest public key.

Advantageously, embodiments described above enable a VM to be securely booted through the use of a chain of validations. Specifically, for instance, a kernel validates a hypervisor, which validates a secure-boot file and variable set file used to securely boot the VM. Thus, through validation, the trust of the hypervisor can be extended to the operating system of the VM.

Additionally or alternatively to the above, in some embodiments of the invention, the hypervisor public key is signed with a kernel private key. The host is configured to run the hypervisor, where the host comprises a kernel comprising a kernel public key corresponding to the kernel private key, such that the kernel is configured to validate the hypervisor public key. Advantageously, this extends the chain of trust into the kernel of the host. As a result, a secure boot of the host is extended to the VM operating system.

Additionally or alternatively to the above, in some embodiments of the invention, the kernel is prevented from running unsigned hypervisors. Advantageously, this prevents attacks that might exist through the use of a malicious hypervisor, which could claim to validate a malicious secure-boot file or variable set file.

Additionally or alternatively to the above, in some embodiments of the invention, process tracing is disabled on the host. Advantageously, this can prevent attacks through the memory code of the host.

Additionally or alternatively to the above, in some embodiments of the invention, the host can support two or more modes, such as a monitor mode and a monitor and protect mode. In that case, one or more of the following may be customized to a current mode of the host: the guest public key and its corresponding guest private key; the hypervisor public key and its corresponding hypervisor private key; the kernel public key and its corresponding kernel private key; and the hypervisor. The hypervisor may include a respective guest public key for each mode, the kernel may maintain a respective hypervisor public key for each mode, and the host may maintain a respective kernel public key for each mode. Advantageously, this enables the mode of the host to be extended to the securely booted VM, such that a protective mode of the host is carried through the VM.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
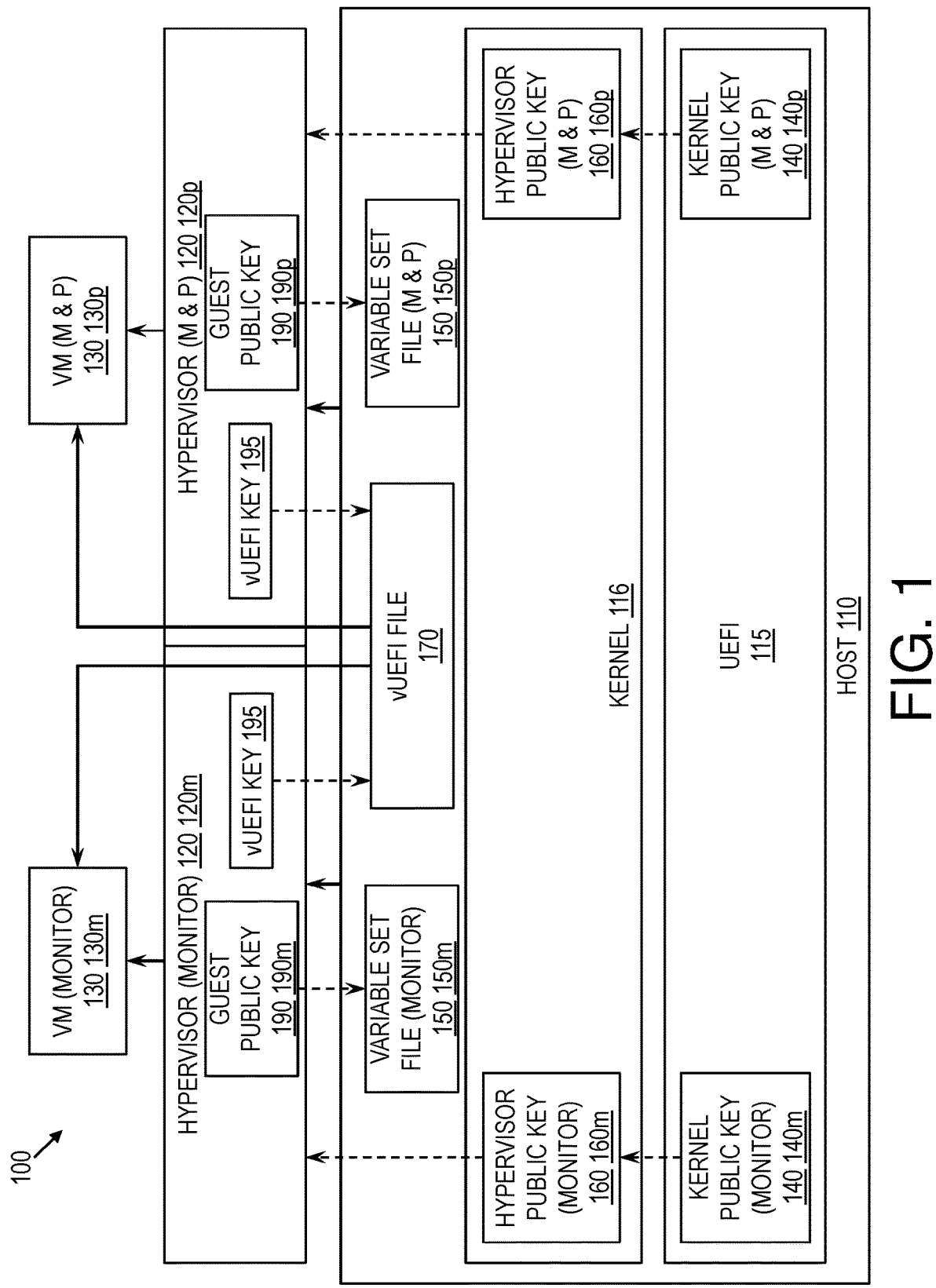
FIG. 1 is a diagram of a security system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of the aspects of the invention, one or more embodiments of the invention address the above-described shortcomings of the prior art by preventing a rogue user, who is logged onto an operating system of a computer system, from altering a guest (i.e., VM) operating system on a virtual machine. To this end, a kernel public key is used to verify a signed hypervisor public key, which is used to verify a signed VM executable. The VM executable includes an embedded guest public key and virtual UEFI (vUEFI) public key, the former of which is used to verify a vUEFI variable set file, and the latter of which is used to verify a vUEFI code. The vUEFI code utilizes the vUEFI variable set file to boot the VM based on the VM executable. Further, in some embodiments of the invention, various modes are supported, such that this hierarchy of trust exists for each such mode.

The above-described aspects of the invention address the shortcomings of the prior art by enforcing a hierarchy of trust from the kernel to the vUEFI code that securely boots the virtual machine. With the various components verified through a chain that begins with the kernel of the host that has been securely booted, a virtual machine can be securely booted as well. As a result, a user can be assured that both the host and virtual machine are secure from rogue users with access to the operating system of the host.

Turning now to a more detailed description of aspects of the present invention, FIG. 1 is a diagram of a security system 100 according to some embodiments of the invention. As shown in FIG. 1, the security system 100 is integrated with a host 110, or host computer system, that includes conventional UEFI 115. The host 110 may include a kernel 116 and may run a hypervisor 120, over which one or more VMs 130 are to run. Specifically, for instance, an operating system of the host 110 may run the hypervisor 120. In some embodiments of the invention, the hypervisor 120 is the open-source qemu-kvm, but this need not be the case. The UEFI 115 of the host 110 may further include one or more host keyrings, which may include a host keyring (i.e., a set of keys on the host) for each supported mode if multiple modes are supported, as will be described below. For instance, each host keyring may include a kernel public key 140 applicable to the mode corresponding to the host keyring. For example, and not by way of limitation, in the case where a monitor mode and a monitor and protect (M & P) mode are supported, the UEFI 115 of the host 110 may include both a monitor kernel public key 140m and a M & P kernel public key 140p.

The host 110 may include, for each supported mode, a respective variable set file 150 and a vUEFI file 170, also referred to herein as a secure-boot file 170, which may include code for booting each VM 130, regardless of mode. For instance, the vUEFI file 170 and each variable set file 150 may be maintained in the operating system of the host 110. Additionally, the kernel 116 of the host 110 may include a hypervisor public key 160. Generally, the vUEFI file 170 is an analog to the conventional UEFI 115 on the host 110. Generally, the secure-boot file, such as the vUEFI file 170, begins a chain of trust through validations of signed components used to boot a VM 130, as described herein, thereby securely booting the VM 130. In some embodiments, the vUEFI file 170 is common to the various modes. Thus, in the case of two modes, specifically the monitor mode and the M & P mode, the host 110 may include a monitor variable set file 150m, a monitor hypervisor public key 160m, a M & P variable set file 150p, a M & P hypervisor public key 160p, and a shared vUEFI file 170. In some embodiments of the invention, each hypervisor public key 160 is an IMA key residing on an IMA keyring maintained by the kernel 116.

Although this disclosure discusses the use of UEFI 115 and a vUEFI file 170 for secure booting, it will be understood that other mechanisms of secure boot are also supported by embodiments of the invention. More generally, the security system 100 is enabled to extend secure booting from an operating system of the host 110 to the VMs 130 running on the host. One of skill in the art will understand how to substitute another existing form of secure boot or a future form of secure boot for the use of UEFI 115 described herein.

As described above, supported modes may include, for example, monitor mode and M & P mode. Although the disclosure herein refers to the use of two modes, this is for illustrative purposes only. One of skill in the art will understand how to extend the security system 100 to three or more modes or to a single default mode, in which multiple modes are not supported. Although the use of modes is not required, according to some embodiments of the invention, advantageously, the use of modes can enable a mode in which the host 110 is securely booted to be extended through secure boot of one or more VMs 130 on the host 110.

In some embodiments of the invention, a respective hypervisor 120 is supported for each mode of the security system. For instance, in the case of two modes, a monitor mode and a M & P mode, the host 110 may have access to two hypervisor executables, including an executable for a monitor hypervisor 120m and a M & P hypervisor 120p. Generally, the host 110 may run the hypervisor 120 corresponding to the current mode of the host 110, and each VM 130 may be run in the mode of the hypervisor 110, which is the current mode of the hose 110.

Each hypervisor 120 may have embedded data, including verification code, a guest public key 190, and a vUEFI public key 195, also referred to as a vUEFI key 195 or a secure-boot public key 195, all of which will be described in more detail below. For example, and not by way of limitation, the executable of the hypervisor 120 may be modified to embed the applicable guest public key 190, the vUEFI public key 195, and the verification code. Although the verification code and the vUEFI public key 195 may be consistent across hypervisors 120 of various modes, the guest public key 190 of each hypervisor 120 may be specific to the applicable mode. For instance, in the case of a monitor hypervisor 120m, the guest public key 190 may be a monitor guest public key 190m specific to monitor mode, while in the case of a M & P hypervisor 120p, the guest public key 190 may be a M & P guest public key 190p specific to M & P mode.

In some cases, an existing hypervisor 120 may be modified to comply with requirements of the security system 100, according to some embodiments of the invention. For instance, a conventional hypervisor executable may be modified to incorporate a vUEFI public key 195, a guest public key 190, and verification code as described herein, thereby becoming a hypervisor executable compatible with the security system 100.

In some embodiments of the invention, the various keys and files described above may be used to facilitate a hierarchy of trust, such that each VM 130 can be securely booted, specifically in a manner that extends trust from the operating system of the host 110 to the respective operating system of each VM 130. Further, the various modes supported by the host 110 may be extended to the VMs 130 as well.

Various components described above may be signed with appropriate private keys, where each private key has a corresponding public key mentioned above. It is well known in the art of encryption to generate a public key and private key pair, and thus, one of skill in the art will understand how to make and use such pairs of keys. As described above, the UEFI 115, the kernel 116, and the hypervisor 120 may include public keys. With these public keys, these components may verify other components that are signed with the respective private keys, as described further below. The act of signing each component may be performed at various locations, such as on the host 110, or on a separate computer system other than the host 110. It will be understood that the signing described herein may be implemented in various ways.

The vUEFI file 170 on the host 110 may include virtual UEFI code, which may behave in a manner analogous to the UEFI 115 at the host 110, such that the vUEFI file 170 may be used to securely boot each VM 130 by initiating a chain of validations (e.g., the shim program, the grub program, the kernel) specific to the secure-boot process. For instance, in some embodiments of the invention, the vUEFI file 170 may validate the guest shim program; the shim guest program validates the signature of the guest grub program, the guest kernel, and the guest initramfs; and the guest kernel validates the signatures of the guest kernel modules.

However, to ensure that a boot using the vUEFI file 170 is secure, this chain of validations is extended to the kernel 116 of the host 110, according to some embodiments of the invention, because the kernel 116 of the host is secured by way of a secure boot itself. As shown in FIG. 1, the various validations involved, which will be described further below, are illustrated by way of dashed arrows.

To ensure the validity of the vUEFI file 170, the vUEFI file 170 may be signed with a vUEFI private key, which may correspond to the vUEFI public key 195 in the hypervisor 120 regardless of mode. Additionally, the respective variable set file 150 corresponding to each mode may be signed with a guest private key corresponding to the guest public key 190 of the hypervisor 120 of that mode. In some embodiments of the invention, the hypervisor 120 for a particular mode may include the guest public key 190 corresponding to that mode. For instance, the monitor variable set file 150 may be signed with a monitor guest private key, which corresponds to the monitor guest public key 190m described above and embedded in the monitor hypervisor 120m. Further, the verification code of each hypervisor 120 may configure the hypervisor 120 to verify the respective signatures of the vUEFI file 170 (i.e., thereby validating the vUEFI file 170), using the vUEFI public key 195, and the variable set file 150 corresponding to the mode of the hypervisor 120, using the guest public key 190.

In some embodiments of the invention, the verification code may detect the mode of the hypervisor 120 in which the verification code is embedded and may therefore select and verify the appropriate variable set file 150 according to that mode. Alternatively, however, the verification code may be specific to each mode and, thus, may search for a specific variable set file 150 that corresponds to the mode to which the verification code belongs.

Thus, as described above, a hypervisor 120 may be configured to validate the vUEFI file 170 as well as the applicable variable set file 150 to be utilized by the vUEFI file 170. However, to implement a secure boot of each VM 130, the security system 100 may further ensure the validity of the hypervisor 120. For instance, if an unverified hypervisor 120 were to run on the host 110, then there would be no guarantee that the hypervisor 120 would validate the vUEFI file 170, and the booting of a VM 130 would thus not be secure.

Each hypervisor 120 may be signed with a hypervisor private key corresponding to the hypervisor public key 160 of the same mode. For instance, the monitor hypervisor 120m may be signed with a monitor hypervisor private key that corresponds to the monitor hypervisor public key 160m of the kernel 116. Given the hypervisor public key 160, which may be maintained by the kernel 116 of the host 110 as described above, the host 110 may validate the hypervisor 120. To ensure that the validation of a hypervisor 120 is performed, the host 110 may include a policy requiring that all hypervisors 120 be signed. For example, and not by way of limitation, the host IMA policy may be modified so that all hypervisor executables, as well as mind mapping (MMAP) files in some embodiments of the invention, require signature verification. As a result, in some embodiments of the invention, this operation of validating hypervisors 120 cannot be avoided by the host 110. Thus, the host 110 may be configured to validate each hypervisor 120, which may be configured to validate the vUEFI file 170 and the appropriate variable set file 150 utilized to securely boot a VM 130. However, to implement a secure boot of each VM 130, the security system 100 may further ensure the validity of the hypervisor public key 160. For instance, if the hypervisor public key 160 has been tampered with by a rogue user, then it could be used to validate a hypervisor 120 that is malicious.

Each hypervisor public key 160 in the kernel 116 may be signed with a kernel private key corresponding to the kernel public key 140 of the same mode. For instance, the monitor hypervisor public key 160m may be signed with a monitor kernel private key that corresponds to the monitor kernel public key 140m. Given the kernel public key 140, which may be maintained by the UEFI 115 of the host 110 as described above, the operating system of the host 110 may verify the validity of the hypervisor public key 160 in the kernel 116. Thus, using a kernel public key 140 corresponding to the current mode of the host 110, where that kernel public key 140 may be selected from the keyring corresponding to the current mode of the host 110, the host 110 may verify the hypervisor public key 160 corresponding to that mode. Further, with the hypervisor public key 160, the kernel 116 may verify the hypervisor 120 of that mode, and the hypervisor 120 may be configured to verify the common vUEFI file 170 as well as the variable set file 150 of the mode, to securely boot a VM 130.

Because the host 110 conventionally includes a kernel public key 140 for each mode supported through secure boot, each kernel public key 140 is already trusted through the secure booting of the host operating system. Thus, through the chain of signings and verifications from the host 110 to the VMs 130 themselves, the secure booting is extended from the host 110 to the VMs 130, according to some embodiments of the invention.

Additionally, in some embodiments of the invention, the security system 100 prevents the changing of memory code in various components described above, such as some or all of the following: the hypervisor 120; the vUEFI file 170, which includes the virtual UEFI code; the variable set files 150; the guest shim executable; the guest grub executable; the guest kernel; the guest initramfs; and the guest kernel modules. For example, and not by way of limitation, to this end, an SELinux Boolean variable may be set to disable process tracing (ptrace) on the host 110. Further, after the Boolean variable is set, the SELinux policy may be locked so that no further changes can occur, such as changes that re-enable ptrace. Advantageously, this may prevent any user, including unconfined users, from using ptrace on the host 110 to modify the memory applicable to these components.

In some embodiments of the invention, multiple modes are supported (e.g., monitor mode and M & P mode). Further, in some embodiments of the invention, multiple modes are supported, and the security system 100 prevents the changing of memory code, such as by way of disabling ptrace. As a result, advantageously, a protective mode of the host 110 is extended to a securely booted VM 130, and further security is provided by preventing attacks through the memory code.

Figure 2:
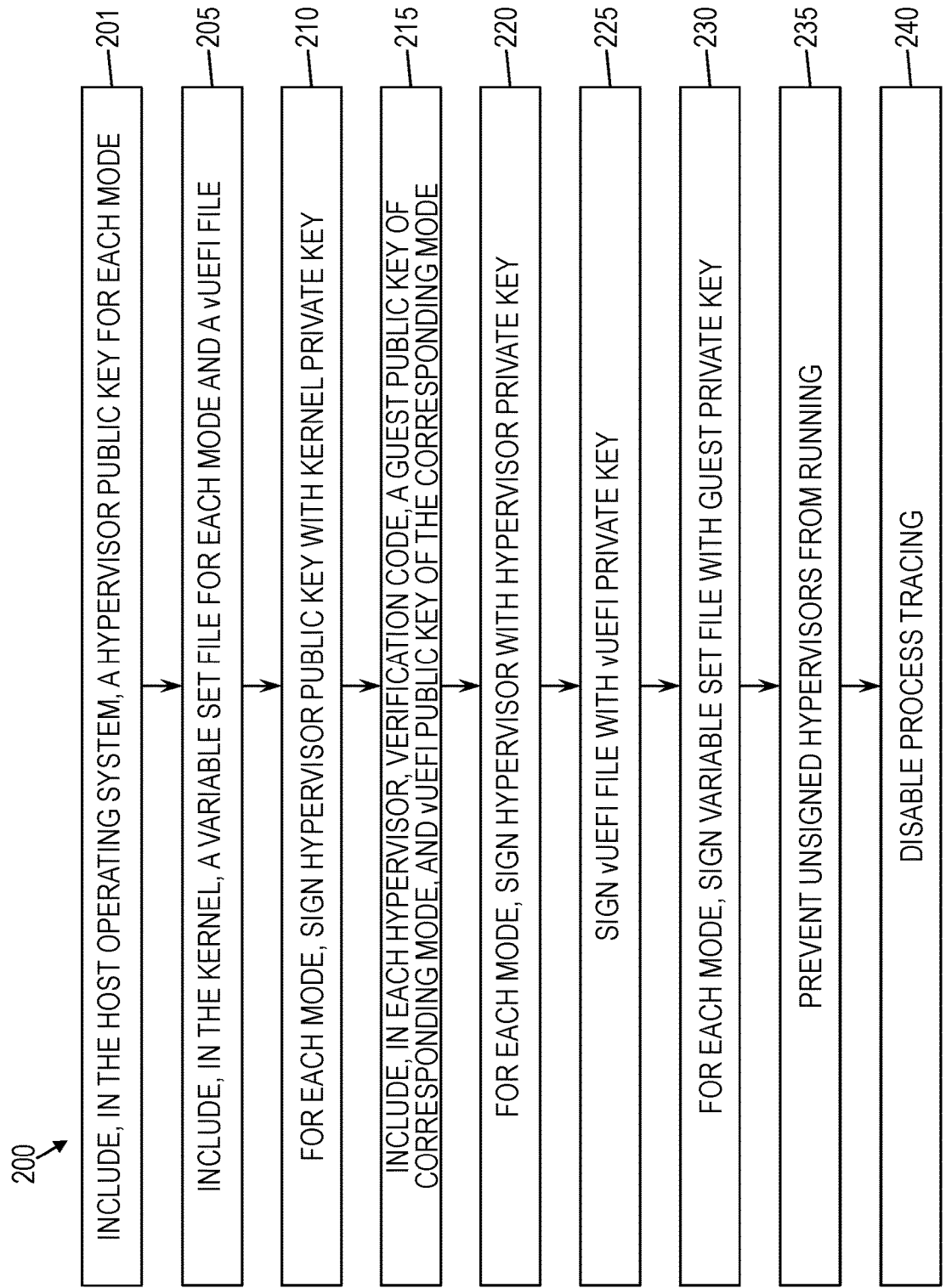
FIG. 2 is a flow diagram of a method of initializing a host to implement the security system, according to some embodiments of the invention.

FIG. 2 is a flow diagram of a method 200 of initializing a host 110 to implement the security system 100, according to some embodiments of the invention. The method 200 may be performed to enable the host 110 to securely boot VMs 130. Prior to the method 200 being performed, the host 110 itself may be configured to support UEFI secure boot and may thus have a kernel public key 140 for each supported mode. Although the below description of the method 200 refers to only a single mode, it will be understood that the method 200 can be extended to support multiple modes.

As shown in FIG. 2, at block 201, the following may be included in the host 110, specifically, for instance, in the host operating system: a variable set file for each mode as well as a vUEFI file 170. At block 205, a hypervisor public key 160 for each mode of the host 110 may be included in the kernel 116. At block 210, each hypervisor public key may be signed with a kernel private key of the corresponding mode, where each such kernel private key corresponds to the respective kernel public key 140 of the same mode. At block 215, each hypervisor 120 may be modified to include each of the following: verification code, a guest public key 160 corresponding to the mode of the hypervisor 120, and a vUEFI public key 195. At block 220, for each mode, a kernel private key corresponding to the kernel public key 140 for the mode may be used to sign the hypervisor public key 160 of that mode. At block 225, the vUEFI file may be signed with a vUEFI private key corresponding to the vUEFI public key 195 embedded in each hypervisor 120. At block 230, for each mode, the respective variable set file 150 of the mode may be signed by a gust private key corresponding to the guest public key 190 of that mode. Further, at block 235, unsigned VM executables 180 may be prevented from running, and at block 240, process tracing may be disabled on the host 110.

Figure 3:
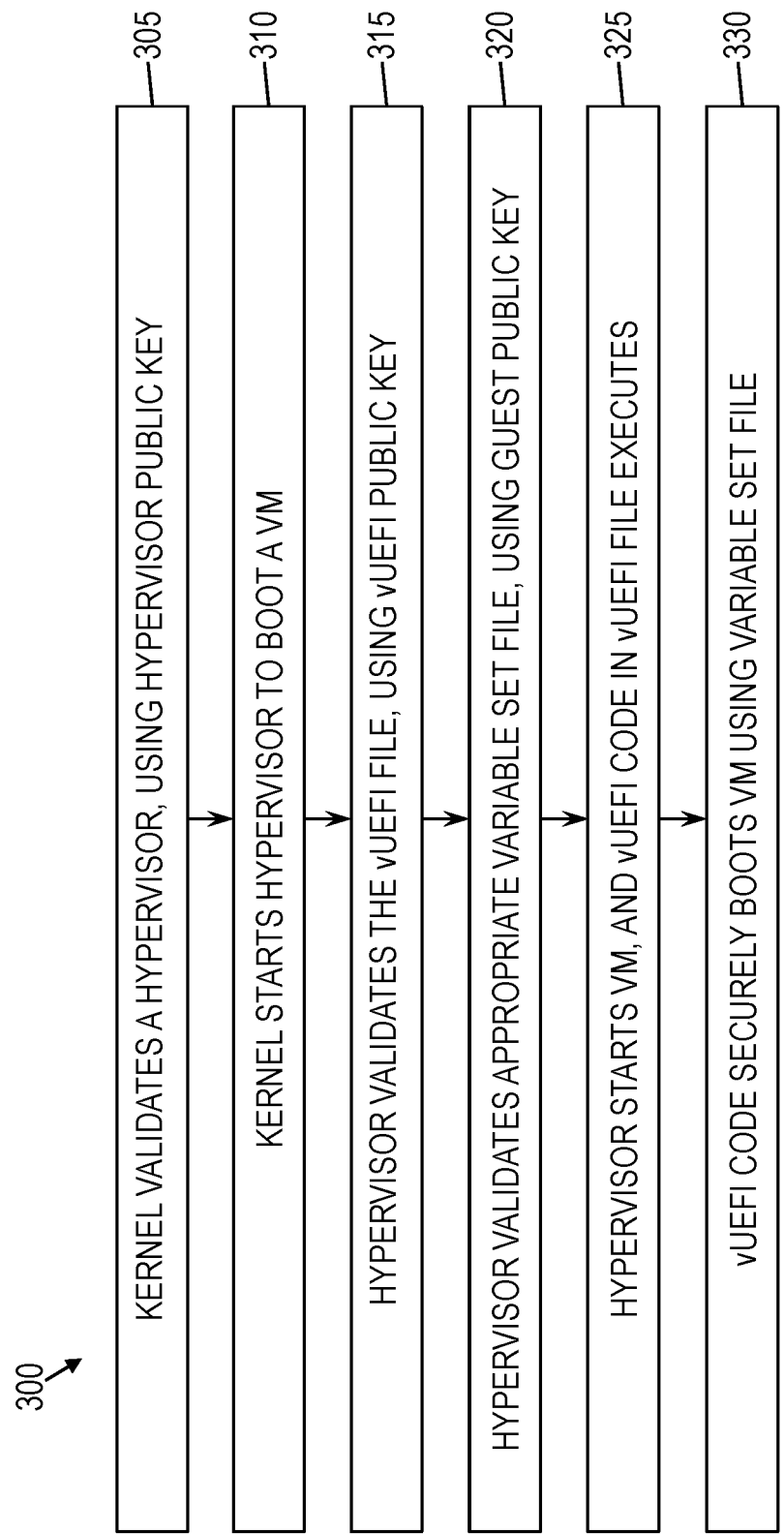
FIG. 3 is a flow diagram of a method of securely booting a virtual machine, according to some embodiments of the invention.

FIG. 3 is a flow diagram of a method 300 of securely booting a VM 130, according to some embodiments of the invention. In some embodiments of the invention, this method 300 or similar may be run to securely boot a VM 130 from a VM executable 180 after the host 110 has been initialized as described above or by a similar method 200 as described above.

As shown in FIG. 3, at block 305, the kernel 116 validates a hypervisor 120, using the hypervisor public key 160. At block 310, the kernel 116 starts a hypervisor 120 in order to boot a VM 130. At block 315, the hypervisor 120 validates the vUEFI file 170, using the vUEFI public key 195. At block 320, the hypervisor 120 validates the appropriate variable set file 150 on the host 110, using the guest public key 190 of that hypervisor 120, where the variable set file 150 matches the mode of the hypervisor 120. At block 325, the hypervisor 120 starts the VM 130, and the vUEFI code in the vUEFI file executes. At block 330, the vUEFI code in the vUEFI file 170 securely boots a VM 130 using the variable set file 150, by initiating the further chain of validations according to UEFI secure booting. It will be understood, however, that the order of these validations may vary. For example, and not by way of limitation, the kernel 116 may validate the hypervisor 120 before the hypervisor 120 validates the variable set file 150, or the reverse may occur.

If, at any point in this method 300, validation of a component fails, then the VM 130 will fail to boot, according to some embodiments of the invention. Further, in some embodiments of the invention, because the host 110 may utilize only the keyring applicable to its current mode, validation will fail at some point along the chain of validations if the hypervisor 120 running does not match the mode of the host 110. For instance, if there is a mode mismatch between the hypervisor 120 and the hypervisor public key 160 used to validate the hypervisor 120, then validation will fail in some embodiments of the invention because, in that case, a non-corresponding hypervisor private key, for a different mode, was used to sign the hypervisor 120. For another instance, if there is a mode mismatch between the hypervisor public key 160 and the kernel public key 140 used to validate the hypervisor public key 160, then validation will fail in some embodiments of the invention because, in that case, a non-corresponding kernel private key, for a different mode, was used to sign the hypervisor public key 160. Thus, advantageously, the mode of the host 110 may be enforced in secure booting of the VMs 130 to ensure that the protective mode selected for the host 110 is extended through to the VMs 130.

Figure 4:
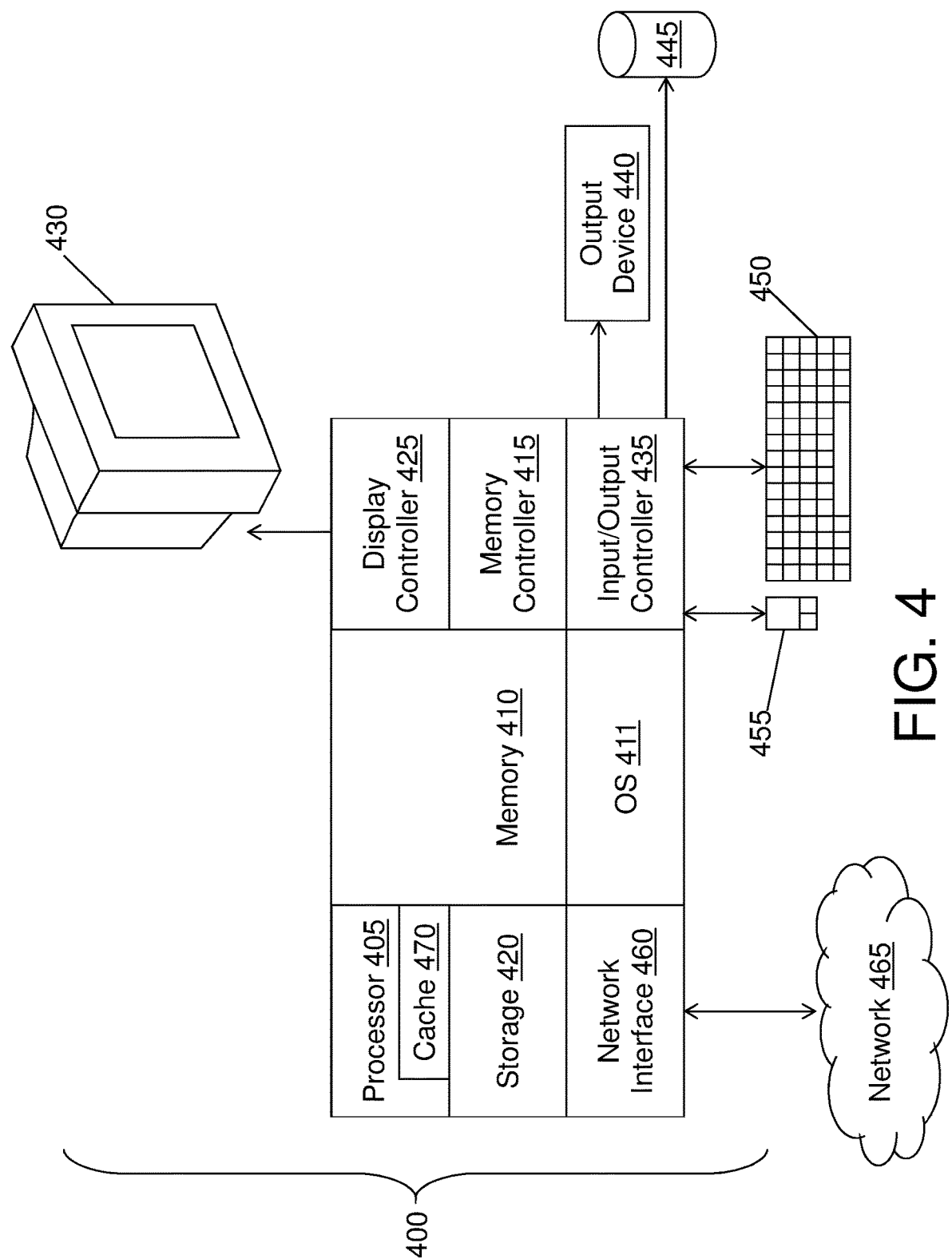
FIG. 4 is a block diagram of a computer system for implementing some or all aspects of the security system, according to some embodiments of this invention.

FIG. 4 is a block diagram of a computer system 400 for implementing some or all aspects of the security system 100, according to some embodiments of this invention. The security systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For example, and not by way of limitation, the host 110 may be a computer system 400 as described herein.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor-based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the security systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Security systems 100 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
    a secure-boot file configured to securely boot a virtual machine (VM), the secure-boot file signed with a boot private key;
    a hypervisor configured to run the VM, the hypervisor comprising a boot public key corresponding to the boot private key, the hypervisor configured to validate the secure-boot file, and the hypervisor signed with a hypervisor private key; and
    a host configured to run the hypervisor, a kernel of the host comprising a hypervisor public key corresponding to the hypervisor private key, and the host configured to validate the hypervisor.

2. The system of claim 1, wherein the hypervisor public key is signed with a kernel private key, and the system further comprises:
    a host configured to run the hypervisor, the host comprising a kernel public key corresponding to the kernel private key,
    wherein the host is configured to validate the hypervisor public key in the kernel.

3. The system of claim 2, wherein the host is prevented from running an unsigned hypervisor.

4. The system of claim 2, wherein process tracing is disabled at the host.

5. The system of claim 1, wherein the hypervisor is customized to a first mode, and wherein the hypervisor public key is associated with the first mode, and the system further comprises:
    a second hypervisor that is customized to a second mode distinct from the first mode, wherein the second hypervisor is signed with a second hypervisor private key,
    wherein the hypervisor public key associated with the first mode fails to validate the second hypervisor.

6. The system of claim 5, wherein the first mode is a monitor mode.

7. The system of claim 6, wherein the second mode is a monitor and protect mode.

8. A computer-program product for securely booting a virtual machine, the computer-program product comprising a computer-readable storage medium having program instructions embodied therewith, the program instructions executable by a processor to cause the processor to perform a method comprising:
    validating a variable set file for a secure boot, the variable set file comprising one or more variables for the secure boot, the validating the variable set file performed by a hypervisor using a guest public key, and the variable set file signed with a guest private key corresponding to the guest public key;
    validating a secure-boot file configured to securely boot a virtual machine (VM) based at least in part on the variable set file, the validating the secure-boot file performed by the hypervisor using a boot public key, and the secure-boot file signed with a boot private key corresponding to the boot public key; and
    executing the secure-boot file to securely boot the VM.

9. The computer-program product of claim 8, wherein the variable set file is utilized by the secure-boot file to securely boot a first version of the VM in a first mode.

10. The computer-program product of claim 9, wherein a second variable set file is configured to enable the secure-boot file to securely boot a second version of the VM in a second mode distinct from the first mode.

11. The computer-program product of claim 8, wherein the hypervisor is signed with a hypervisor private key corresponding to a hypervisor public key stored in a kernel of a host configured to run the hypervisor.

12. The computer-program product of claim 11, wherein the hypervisor public key is signed with a kernel private key corresponding to a kernel public key stored on a host running the hypervisor.

13. A computer-implemented method comprising:
starting a hypervisor to boot a first version of a VM, wherein the hypervisor embeds a boot public key;
validating, by the hypervisor, a secure-boot file configured to securely boot the first version of the VM to extend a secure boot of a host, the validating the secure-boot file performed using the boot public key; and
validating, by the hypervisor, a variable set file useable by the secure-boot file to securely boot the VM, the variable set file comprising one or more variables for securely booting the first version of the VM.

14. The computer-implemented method of claim 13, further comprising validating, by a kernel, the hypervisor using a hypervisor public key stored in the kernel.

15. The computer-implemented method of claim 14, further comprising validating, by a host running the hypervisor, the hypervisor public key, wherein the validating the hypervisor public key is performed using a kernel public key stored on the host.

16. The computer-implemented method of claim 15, wherein the hypervisor, the hypervisor public key, and the kernel public key are associated with a first mode of the host.

17. The computer-implemented method of claim 16, further comprising:
starting a second hypervisor to boot a second version of the VM, wherein the second hypervisor embeds a second boot public key associated with a second mode of the host,
wherein the second mode is distinct from the first mode; and
failing to validate, by the kernel, the second hypervisor, wherein the kernel attempts to validate the second hypervisor using the hypervisor public key associated with the first mode of the host.

18. The computer-implemented method of claim 16, further comprising:
starting a second hypervisor to boot a second version of the VM, wherein the second hypervisor embeds a second boot public key associated with a second mode of the host,
wherein the second mode is distinct from the first mode; and
failing to validate, by the host, a second hypervisor public key associated with the second mode, wherein the host attempts to validate the second hypervisor public key with the kernel public key associated with the first mode.

19. The computer-implemented method of claim 15, further comprising preventing an unsigned hypervisor from running, responsive to the unsigned hypervisor being unsigned.

20. A computer-implemented method comprising:
providing a secure-boot file in an operating system of a host, the secure-boot file configured to securely boot one or more virtual machines (VMs) to extend a secure boot of the host to the one or more VMs;
providing one or more variable set files in the operating system, the one or more variable set files useable by the secure-boot file to securely boot the one or more VMs;
providing a hypervisor public key in a kernel of the host;
providing, in a hypervisor configured to run a first version of a VM, a boot public key and a guest public key;
signing the hypervisor with a hypervisor private key corresponding to the hypervisor public key in the kernel;
signing the secure-boot file of the operating system with a boot private key corresponding to the boot public key of the hypervisor; and
signing a first variable set file, of the one or more variable set files, with a guest private key corresponding to the guest public key of the hypervisor.

21. The computer-implemented method of claim 20, further comprising signing the hypervisor public key with a kernel private key corresponding to a kernel public key of the host.

22. The computer-implemented method of claim 21, wherein the host is configured to be securely booted in two or more modes, comprising a first mode and a second mode, and wherein the hypervisor is configured for secure booting in a mode common to the host.

23. The computer-implemented method of claim 20, further comprising disabling process tracing on the host.

24. The computer-implemented method of claim 20, further comprising:
providing a second hypervisor for securely booting a second version of the VM, the second hypervisor comprising the boot public key and a second guest public key,
wherein the hypervisor is associated with a first mode, and wherein the second hypervisor is associated with a second mode distinct from the first mode;
signing the second hypervisor with a second hypervisor private key corresponding to a second hypervisor public key on the kernel, wherein the second hypervisor public key is associated with the second mode; and
signing a second variable set file, of the one or more variable set files, with a second guest private key corresponding to the second guest public key of the second hypervisor.

25. The computer-implemented method of claim 24, further comprising:
signing the second hypervisor public key with a second kernel private key corresponding to a second kernel public key of the host,
wherein the second hypervisor is configured for booting the second version of the VM in a mode common to the host.

* * * * *